(12) United States Patent
Hayashida et al.

(10) Patent No.: US 7,552,544 B2
(45) Date of Patent: Jun. 30, 2009

(54) DIGITAL DISPLACEMENT MEASURING INSTRUMENT

(75) Inventors: Shuji Hayashida, Kawasaki (JP); Shozaburo Tsuji, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 25 days.

(21) Appl. No.: 12/010,169

(22) Filed: Jan. 22, 2008

(65) Prior Publication Data
US 2008/0250665 A1 Oct. 16, 2008

(30) Foreign Application Priority Data
Jan. 25, 2007 (JP) ............... 2007-014630

(51) Int. Cl.
*G01B 3/18* (2006.01)
(52) U.S. Cl. .......................... 33/825; 33/831
(58) Field of Classification Search ............. 33/1 PT, 33/813, 814, 819, 825, 831
See application file for complete search history.

(56) References Cited

U.S. PATENT DOCUMENTS

| | | | | |
|---|---|---|---|---|
| 3,686,766 A | * | 8/1972 | Matumoto | 33/819 |
| 4,578,868 A | * | 4/1986 | Sasaki et al. | 33/819 |
| 5,829,155 A | * | 11/1998 | Takahashi et al. | 33/813 |
| 6,260,286 B1 | * | 7/2001 | Suzuki et al. | 33/813 |
| 6,308,433 B1 | * | 10/2001 | Takahashi et al. | 33/819 |
| 7,013,576 B2 | | 3/2006 | Hayashida et al. | |
| 2004/0250439 A1 | * | 12/2004 | Hayashida et al. | 33/813 |
| 2005/0274034 A1 | * | 12/2005 | Hayashida et al. | 33/813 |

FOREIGN PATENT DOCUMENTS

| | | |
|---|---|---|
| EP | 0047463 A1 | 3/1982 |
| EP | 1 324 000 A1 | 7/2003 |
| EP | 1 832 853 A2 | 9/2007 |
| JP | A 2003-202201 | 7/2003 |

* cited by examiner

*Primary Examiner*—G. Bradley Bennett
(74) *Attorney, Agent, or Firm*—Oliff & Berridge, PLC

(57) ABSTRACT

A rotor bushing restrictor (50) that prevents a rotor bushing (44) from moving away from a stator (42) is provided. The rotor bushing restrictor (50) includes a fixing member (51) fixed on a body and a rotor bushing attitude retainer (52) placed between the rotor bushing (44) and the fixing member (51). The rotor bushing attitude retainer (52) includes two first abutment portions (522) contacted with the rotor bushing (44) and two second abutment portions (523) contacted with the fixing member (51). The two first abutment portions (522) are symmetrically placed to each other with respect to the axis of the spindle (2), and the two second abutment portions (523) are symmetrically placed to each other with respect to the axis of the spindle (2). The two first abutment portions (522) and the two second abutment portions (523) are placed such that a straight line connecting the two first abutment portions (522) and a straight line connecting the two second abutment portions (523) are orthogonal with each other.

5 Claims, 9 Drawing Sheets

DIGITAL DISPLACEMENT MEASURING INSTRUMENT

BACKGROUND OF THE INVENTION

1. Field of the Invention

The present invention relates to a digital displacement measuring instrument that measures dimension and the like of an object based on axial displacement of a spindle.

2. Description of Related Art

A digital micrometer, one of general digital displacement measuring instruments, includes a body, a spindle slidably provided on the body, an encoder for detecting displacement of the spindle and a display for digitally displaying displacement of the spindle which is calculated from the detected value of the encoder.

The encoder has an opposing arrangement of a stator fixed onto the body and a rotor capable of synchronized rotation with the spindle, where the displacement of the spindle relative to the body is detected as a rotation angle of the rotor relative to the stator.

FIGS. 6 and 7 show a configuration around a rotor of a general digital micrometer. A rotor 41 is supported by a rotor bushing 44 that has an engaging key 43. A key groove 23 is axially formed on an external surface of the spindle 2 to be fitted with the engaging key 43.

A fixing member 51 that is fixed onto the body (not shown) and prevents the rotor bushing 44 from moving along the axial direction of the spindle 2 away from the stator 42 is provided on the opposite side of the stator 42, sandwiching the rotor bushing 44.

This arrangement helps the rotor 41 to stay at a predetermined position keeping a constant gap to the stator 42 regardless of the axial movements of the spindle 2.

The spindle 2 axially advances and retracts rotating in the circumferential direction of the body of the digital micrometer. Accordingly, since the rotor bushing 44 rotates in synchronization with the spindle 2, the rotation angle of the rotor 41 relative to the stator 42 is detected by the encoder to be converted to the displacement of the spindle 2 to be digitally displayed.

As above-mentioned, in the digital micrometer, the key groove 23 axially formed on the external surface of the spindle 2, the engaging key 43 that can be fitted with the key groove 23 and the rotor bushing 44 that includes the engaging key 43 are used in combination as a rotation transfer mechanism that transfers the rotation of the spindle 2 to the rotor 41 while keeping the constant gap between the stator 42 and the rotor 41.

However, in such a rotation transfer mechanism, there is a risk that a rotation transfer error occurs depending on depth position of the engaging key 43 relative to the key groove 23.

For example, as shown in FIG. 8, the fixing member 51 is occasionally hooked on the body, inclining against the spindle 2. Under such a condition, the rotor bushing 44 also inclines with respect to the spindle 2 while causing a problem of depth position of the engaging key 43 relative to the key groove 23.

FIGS. 9A and 9B show a fitting condition of the engaging key 43 and the key groove 23 when the spindle 2 is rotated under the condition where the fixing member 51 inclines with respect to the spindle 2.

Under the condition of FIG. 9A, the engaging key 43 is deeply fitted with the key groove 23. On the contrary, when the spindle 2 is rotated by 180 degrees, the engaging key 43 is shallowly fitted with the key groove 23 as shown in FIG. 9B.

The depth position of the engaging key 43 relative to the key groove 23, thus, cyclically changes according to the rotation of the spindle 2.

The position of the engaging key 43 in the circumferential direction of the spindle also changes concurrently with the change in the depth position of the engaging key 43 relative to the key groove 23, which causes a rotation transfer error.

A digital displacement measuring instrument is proposed as a solution to such a problem, which presses an engaging key into a key groove by a plate spring to tightly fit the engaging key and the key groove constantly to prevent an occurrence of a rotation transfer error (for example, see: JP-A-2003-202201).

However, in the digital displacement measuring instrument as described in the above document, since a pressurization mechanism is required to be provided to press the engaging key into the key groove, number of parts accordingly increases and assembly of the parts becomes complicated. In addition, if too much biasing force is applied by the plate spring, the engaging key is overpressured into the key groove such that the spindle is prevented from smooth advancement and retraction.

To avoid this kind of problem, it is effective that the engaging key is adjusted to be at a depth position where the distal end of the engaging key contacts with the key groove while the engaging key is not overpressured into the key groove. However, this kind of adjustment is difficult since the depth position of the engaging key has to be highly precisely adjusted.

SUMMARY OF THE INVENTION

An object of the present invention is to provide a digital displacement measuring instrument that can support a rotor bushing at a proper position to decrease rotation transfer errors.

A digital displacement measuring instrument according to an aspect of the present invention includes a body, a spindle slidably provided on the body and an encoder that detects displacement of the spindle, in which the encoder has a rotor that rotates in the circumferential direction of the spindle and a stator that is fixed on the body being spaced apart from the rotor by a predetermined gap, the rotor is supported by a rotor bushing having an engaging key engageable with a key groove axially provided on an external circumference of the spindle in a manner that the gap between the rotor and the stator is kept constant, the rotor bushing includes a rotor bushing restrictor that prevents the rotor bushing from moving away from the stator along the axial direction of the spindle, and the rotor bushing restrictor includes a fixing member fixed on the body and a rotor bushing attitude retainer placed between the rotor bushing and the fixing member to be contacted with both of the rotor bushing and the fixing member to keep the rotor bushing in an attitude substantially perpendicular to the axis of the spindle.

According to the aspect of the present invention, since the digital displacement measuring instrument is provided with the rotor bushing restrictor having a fixing member fixed on the body and a rotor bushing attitude retainer placed between the rotor bushing and the fixing member to be contacted with both of the rotor bushing and the fixing member, movements of the rotor bushing along the axial direction of the spindle away from the stator can be restricted.

This arrangement helps the rotor to stay at a predetermined position keeping a constant gap to the stator regardless of the axial movement of the spindle.

Since the rotor bushing attitude retainer contacts with both of the rotor bushing and the fixing member such that the rotor bushing and the axis of the spindle are orthogonal with each other, the rotor bushing can be kept at a proper position without being inclined against the spindle even if the fixing member of the rotor bushing attitude retainer inclines against the spindle.

Accordingly, a problem that the depth position of the engaging key relative to the key groove changes according to the rotation of the spindle becomes therefore less likely to happen and rotation transfer errors can be decreased.

According to the aspect of the present invention, the rotor bushing attitude retainer may preferably include two first abutment portions contacted with the rotor bushing and two second abutment portions contacted with the fixing member, in which the two first abutment portions may be symmetrically placed to each other with respect to the axis of the spindle, the two second abutment portions may be symmetrically placed to each other with respect to the axis of the spindle and the two first abutment portions and the two second abutment portions are placed such that a straight line connecting the two first abutment portions and a straight line connecting the two second abutment portions may be substantially orthogonal with each other.

In such an arrangement, the rotor bushing and the axis of the spindle are orthogonal with each other since the two first abutment portions of the rotor bushing attitude retainer are symmetrically placed to each other with respect to the axis of the spindle, the two second abutment portions are symmetrically placed to each other with respect to the axis of the spindle and the two first abutment portions and the two second abutment portions are placed such that a straight line connecting the two first abutment portions and a straight line connecting the two second abutment portions are orthogonal with each other.

Accordingly, even if the fixing member of the rotor bushing restrictor inclines against the spindle, the rotor bushing can be supported at a proper position without being inclined against the spindle so as to decrease rotation transfer errors.

According to the aspect of the present invention, the fixing member may preferably be formed in a substantially cylindrical shape and may preferably be fixed on the body so as to surround the spindle, the rotor bushing attitude retainer may include a body section that is substantially plate-shaped and a hole provided on the body section through which the spindle passes, and the two first abutment portions may preferably be two projections provided on a first side of the body section and the two second abutment portions may preferably be two projections provided on a second side of the body section.

According to this arrangement, since the fixing member that is substantially cylindrically shaped and fixed on the body so as to surround the spindle is a member also provided on conventional digital displacement measuring instruments, the inclination of the rotor bushing against the spindle can be easily prevented just by applying the rotor bushing attitude retainer to the conventional digital displacement measuring instruments.

In addition, since the rotor bushing attitude retainer is a simply shaped member that includes: the body section that is substantially cylindrically shaped; the hole provided on the body section through which the spindle passes; the two first abutment portions that are two projections provided on the first side of the body section; and the two second abutment portions that are two projections provided on the second side of the body section, the rotor bushing attitude retainer can be inexpensively produced by processing metals, resins and the like, which can suppress the cost for providing the rotor bushing attitude retainer to the conventional digital displacement measuring instruments.

According to the aspect of the present invention, at least one of the rotor bushing and the fixing member may preferably include a rotor bushing attitude retainer restricting section that restricts vertical movement of the rotor bushing attitude retainer with respect to the axis of the spindle.

In such an arrangement, since the rotor bushing attitude retainer restricting section provided on at least one of the rotor bushing and the fixing member restricts the vertical movement of the rotor bushing attitude retainer with respect to the axis of the spindle, the movable scope of the rotor bushing attitude retainer can be limited.

This can prevent, for example, an occurrence of a problem that a smooth rotation of the spindle is interrupted by the spindle contacting with the rotor bushing attitude retainer.

According to the aspect of the present invention, the fixing member may preferably include the rotor bushing attitude retainer restricting section that restricts vertical movement of the rotor bushing attitude retainer with respect to the axis of the spindle and the rotor bushing attitude retainer restricting section may preferably include a recess provided on an end surface of the fixing member on a side of the rotor bushing to house the rotor bushing attitude retainer.

In such an arrangement, since a recess that can house the rotor bushing attitude retainer is added to an end surface, which is on a side of the rotor bushing, of the fixing member provided on conventional digital displacement measuring instruments, it is possible to restrict vertical movement of the rotor bushing attitude retainer with respect to the axis of the spindle and to limit the movable scope of the rotor bushing attitude retainer.

This can prevent, for example, an occurrence of a problem that a smooth rotation of the spindle is interrupted by the spindle contacting with the rotor bushing attitude retainer.

DETAILED DESCRIPTION OF PREFERRED EMBODIMENT(S)

An embodiment of the present invention will be described below with reference to the accompanying drawings.

Although a digital micrometer is mentioned as an example of a digital displacement measuring instrument in the present embodiment, the present invention is not limited to the digital micrometer.

[Arrangement of Digital Micrometer]

Figure 1:
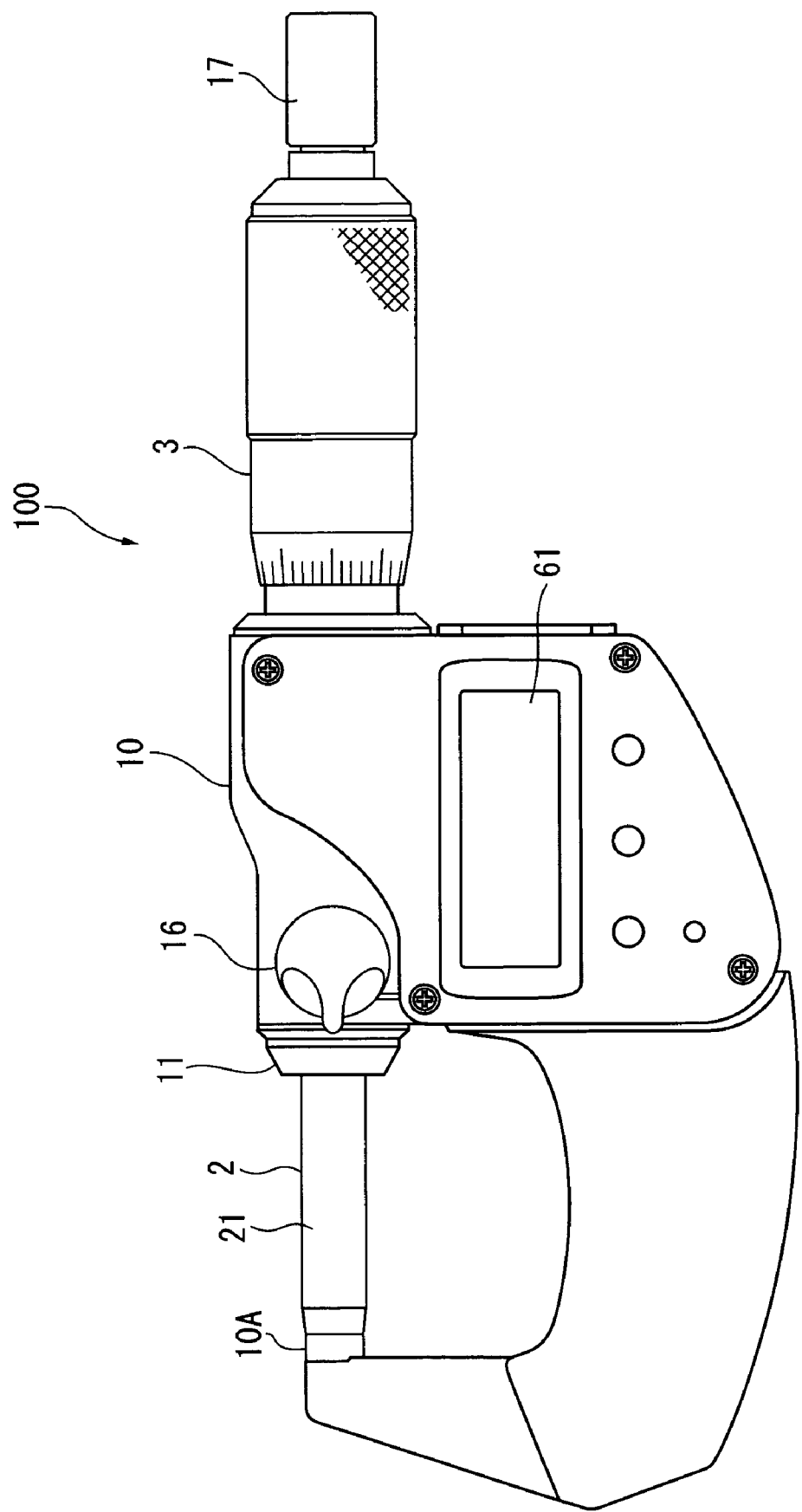
FIG. 1 is a front view showing a digital micrometer of an embodiment of the present invention.
Figure 2:
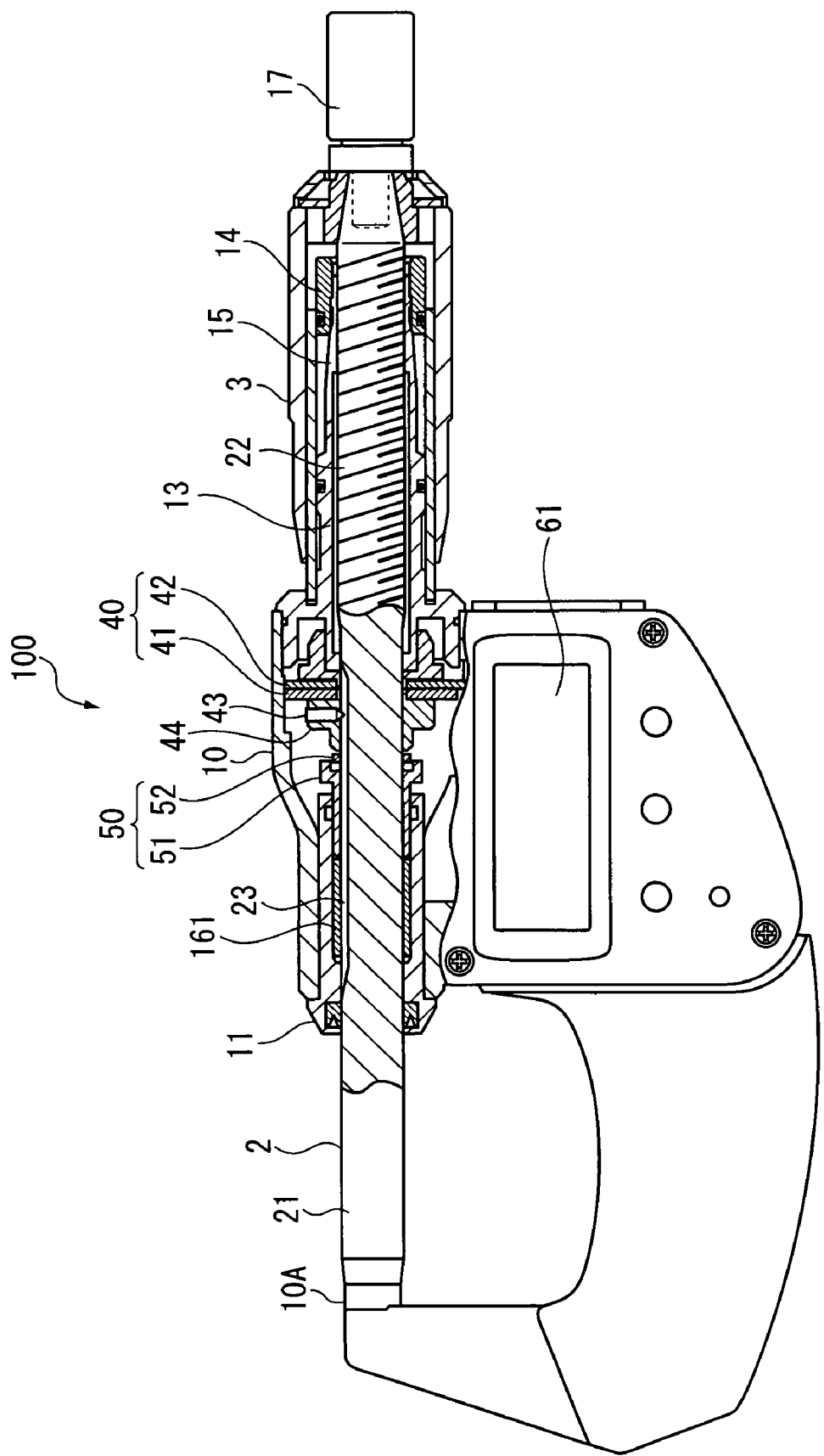
FIG. 2 is a partial cross-sectional view showing a digital micrometer of the embodiment.

FIG. 1 is a front view showing the digital micrometer of the present embodiment. FIG. 2 is a partial cross-sectional view showing the digital micrometer. In FIGS. 1 and 2, a digital micrometer 100 includes a substantially U-shaped body 10, a spindle 2 slidably provided on the body 10, an encoder 40 that detects the displacement of the spindle 2 inside the body 10 and a display 61 that displays a measured value.

An anvil 10A is fixed on a first end of the body 10. A sleeve 11, i.e. a bushing that slidably supports the spindle 2, is provided on a second end of the body 10. The sleeve 11 is formed in a substantially cylindrical shape, in which the spindle 2 is inserted to be supported. A clamping collar 161 is provided on the inner circumference of the sleeve 11 along the axial direction thereof. A clamp screw 16 is provided outside the body 10, which is manipulated to tighten the spindle 2, thereby restricting the slide movement of the spindle 2. An approximately cylindrical inner sleeve 13 is provided on the body 10. A thimble 3 provided on the outer circumference of the inner sleeve 13 is rotated to advance and retract the spindle 2 relative to the anvil 10A.

The spindle 2 includes a spindle body 21 and a threaded shaft 22 that are linearly disposed. The spindle 2 also has a key groove 23 axially provided on the outer circumference of the spindle body 21. The spindle 2 may be formed from a single cylinder member or, alternatively, formed of separate components. The key groove 23 has a V-shaped cross section. The inner sleeve 13 provided along the axial direction of the spindle 2 has a first end held by the body 10 and a second end carved with female screw on the inner circumference thereof to be engaged with the threaded shaft 22 of the spindle 2.

A male screw is carved on the outer circumference of the second end of the inner sleeve 13, to which a taper nut 14 is screwed. Three notches are provided on predetermined sections of the inner sleeve 13 at which the male screw is carved to define a three-way split portion 15. The taper nut 14 is a component for adjusting fitting condition of the spindle 2 and the inner sleeve 13. When the taper nut 14 is rotated to advance and retract along the axial direction of the inner sleeve 13, the tightness applied by the three-way split portion 15 is changed to vary the inner diameter of the inner sleeve 13. As described above, the change in the inner diameter of the inner sleeve 13 allows adjustment of the fitting condition of the spindle 2 and the inner sleeve 13.

A ratchet 17 for holding an object to be measured with a constant pressure is provided on an end of the spindle 2 to prevent damage on the object by applying excessive pressure when the object is held against the anvil 10A by advancing and retracting the spindle 2.

The encoder 40 is an electrostatic encoder, which includes a rotor 41 rotating in the circumferential direction of the spindle 2 and a stator 42 fixed on the body being spaced apart from the rotor 41 by a predetermined gap.

The rotor 41 is formed in a substantially toroidal plate-shape and has an electrode pattern (not shown) on the surface of the stator 42 side. The surface of the rotor 41 on the side remote from the stator 42 is engaged with the rotor bushing 44 such that the rotor 41 is supported by the rotor bushing 44. The rotor bushing 44 and the rotor 41 may be integrally formed or, alternatively, formed of separate components.

The rotor bushing 44 includes an engaging key 43 engageable with the key groove 23 of the spindle 2. A rotor bushing restrictor 50 that prevents the rotor bushing 44 from moving along the axial direction of the spindle 2 away from the stator 42 is provided on the opposite side of the stator 42 sandwiching the rotor bushing 44.

The stator 42 has a substantially toroidal plate-shaped stator ring provided opposing to the outer circumference of the spindle 2 to be electrostatically coupled with the electrode pattern of the rotor 41 to detect the rotation angle of the rotor 41 and a plate-shaped stator extension provided on the outer circumference of the stator ring to be stretched toward the inside of the body 10. The stator extension is fixed to the body 10 in the inside of the body 10.

Figure 3:
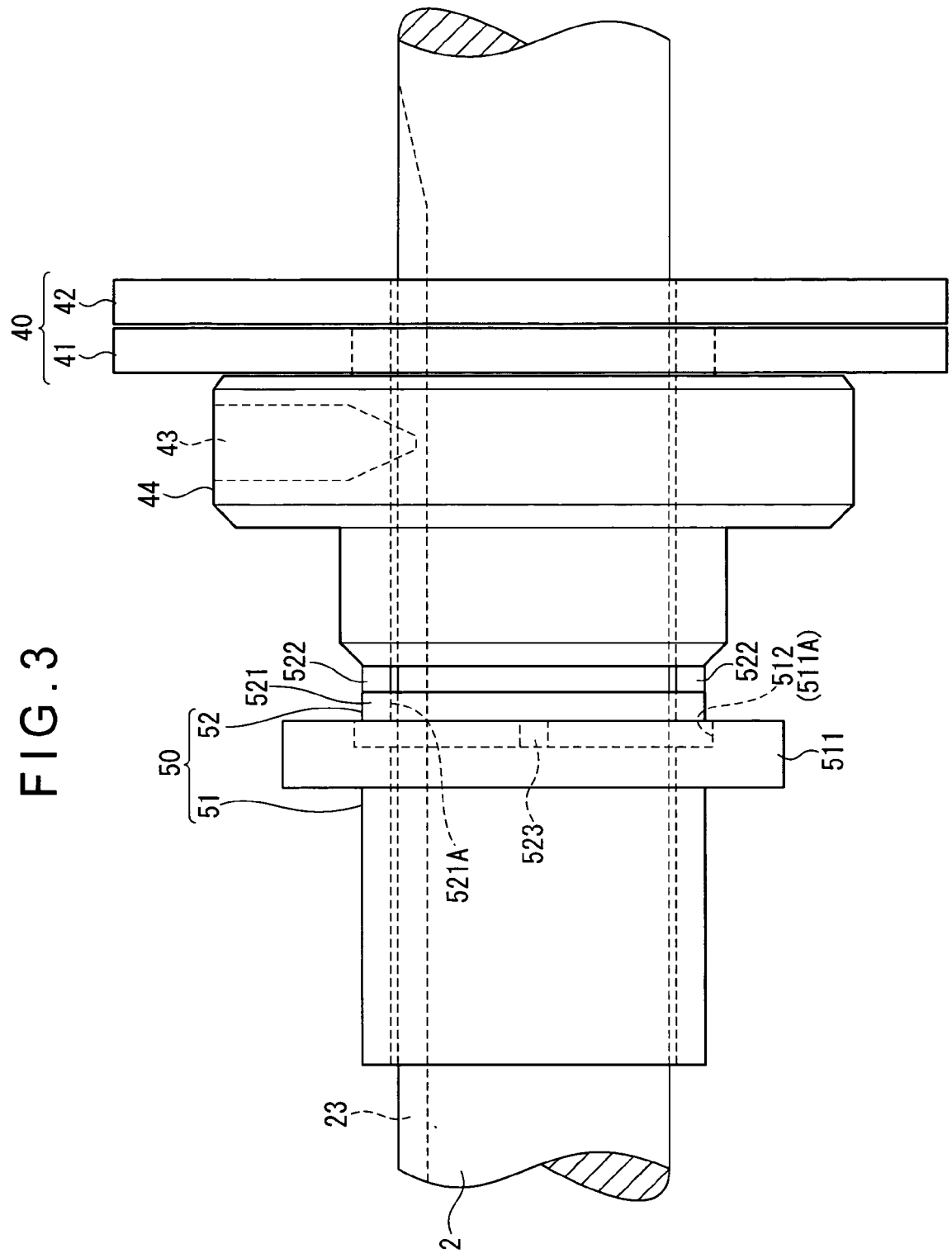
FIG. 3 is a view showing an arrangement around a rotor bushing of the digital micrometer of the embodiment.
Figure 4:
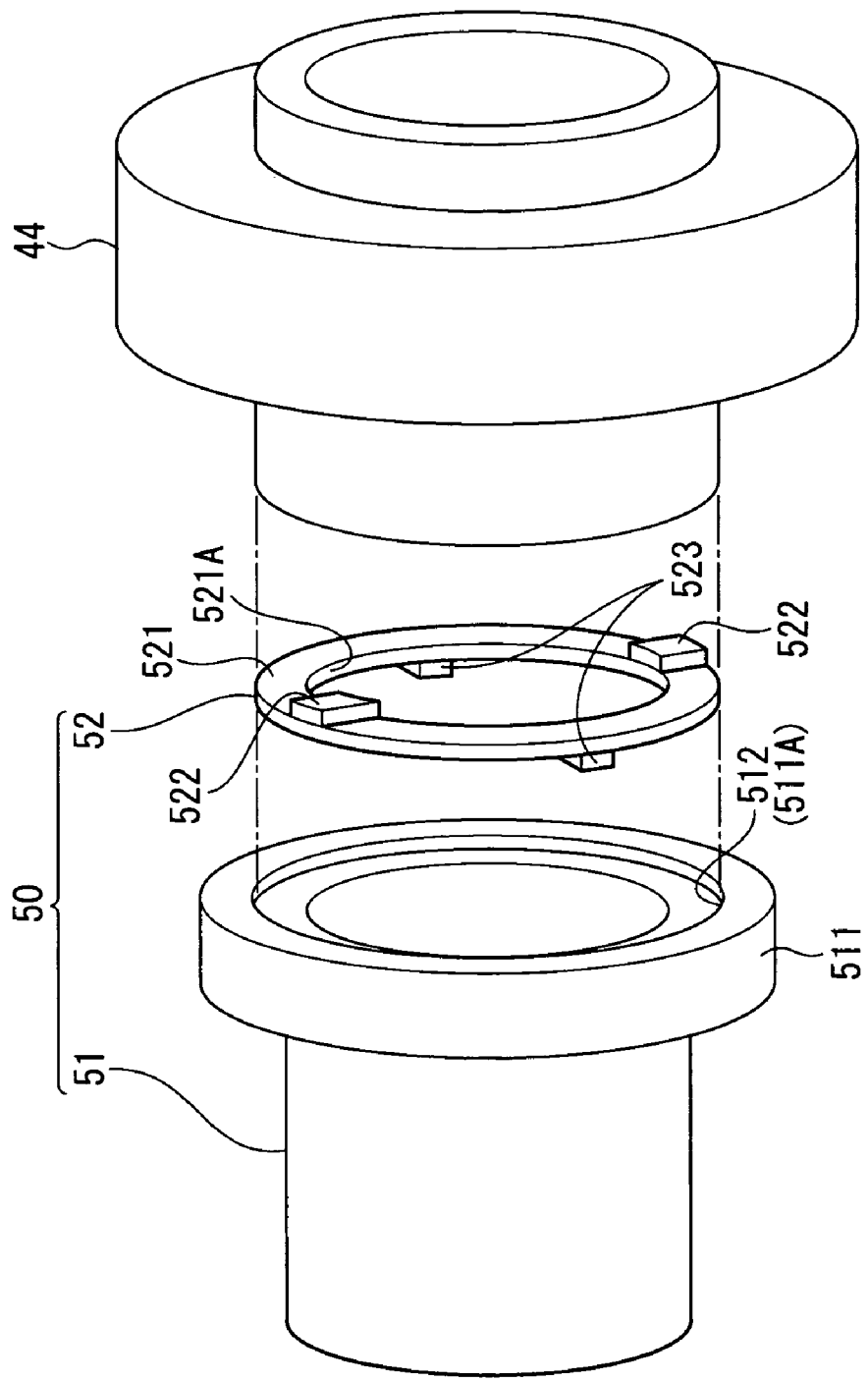
FIG. 4 is an exploded view showing the rotor bushing of the digital micrometer of the embodiment.

FIG. 3 shows a configuration around the rotor bushing of the digital micrometer of the present embodiment. FIG. 4 shows an exploded view of the rotor bushing restrictor.

As shown in FIGS. 3 and 4, the rotor bushing restrictor 50 is provided on the opposite side of the stator 42 sandwiching the rotor bushing 44 and is provided with a fixing member 51 fixed on the body 10 (not shown) and a rotor bushing attitude retainer 52 placed between the rotor bushing 44 and the fixing member 51 to be contacted with both of the rotor bushing 44 and the fixing member 51 to keep the rotor bushing 44 at a position substantially perpendicular to the axis of the spindle 2.

The fixing member 51 is formed in a substantially cylindrical shape and is fixed on the body 10 so as to surround the spindle 2. The fixing member 51 includes a radially extended flange 511 provided on an end of the rotor bushing side of the fixing member 51 and a rotor bushing attitude retainer restricting section 512 provided to restrict vertical movement of the rotor bushing attitude retainer 52 with respect to the axis of the spindle 2. The rotor bushing attitude retainer restricting section 512 is a recess 511A provided on an end surface of the rotor bushing 44 side of the flange 511 to house the rotor bushing attitude retainer 52.

The rotor bushing attitude retainer 52 includes a body section 521 that is substantially disc-shaped, a hole 521A that is substantially circle-shaped and provided on the body section 521 through which the spindle 2 passes, two first abutment portions 522 provided on a first surface of the body section 521 to be contacted with the rotor bushing 44 and two second abutment portions 523 provided on a second surface of the body section 521 to be contacted with the fixing member 51.

The two first abutment portions 522 are projections formed in shape of a substantially rectangular parallelepiped and symmetrically placed to each other with respect to the axis of the spindle 2. The two second abutment portions 523 are projections formed in shape of a substantially rectangular parallelepiped and symmetrically placed to each other with respect to the axis of the spindle 2.

The two first abutment portions 522 and the two second abutment portions 523 are placed such that a straight line connecting the two first abutment portions 522 and a straight line connecting the two second abutment portions 523 are orthogonal with each other.

Figure 5:
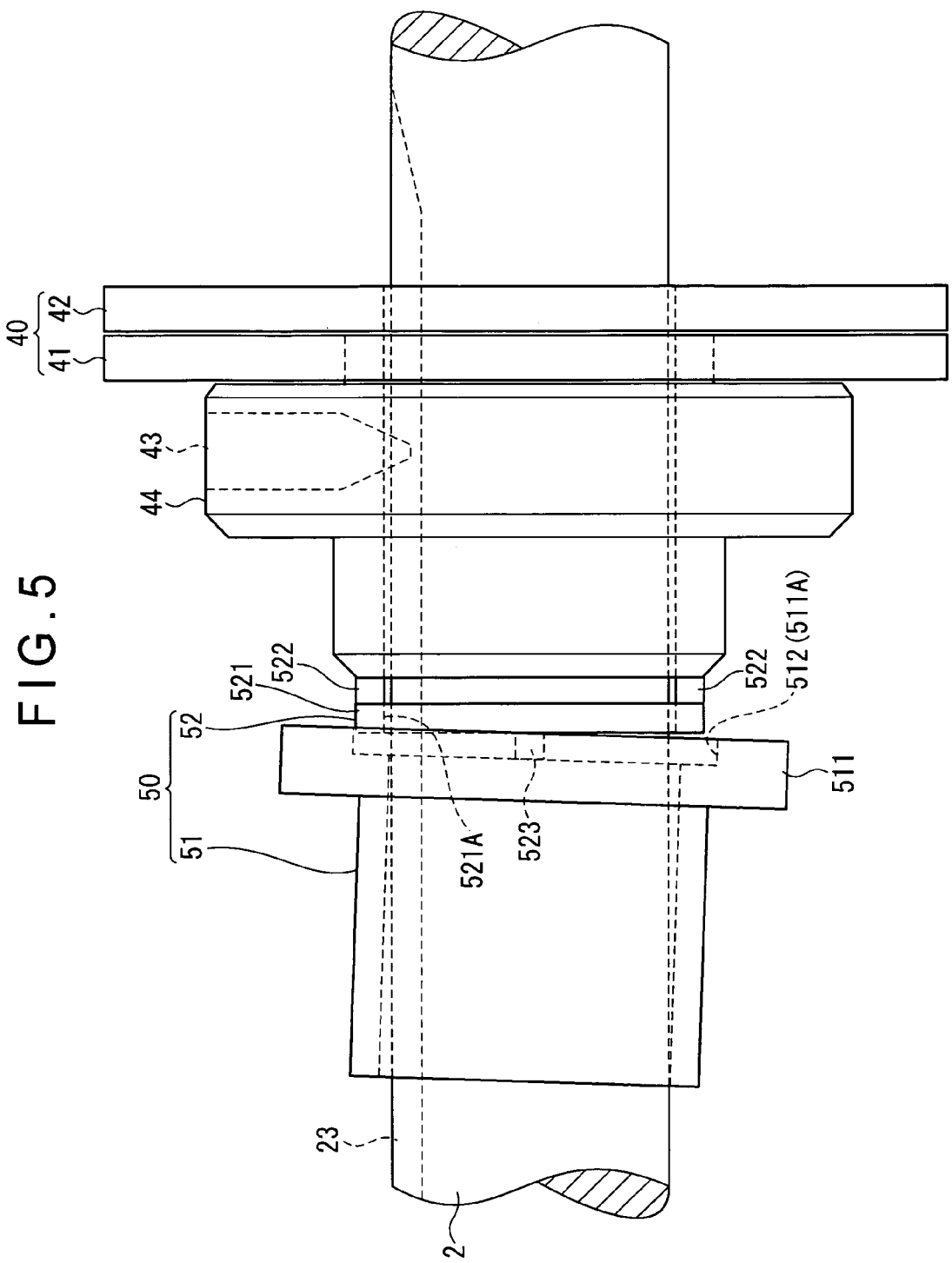
FIG. 5 is a view showing an arrangement around the rotor bushing of the digital micrometer of the embodiment.
Figure 6:
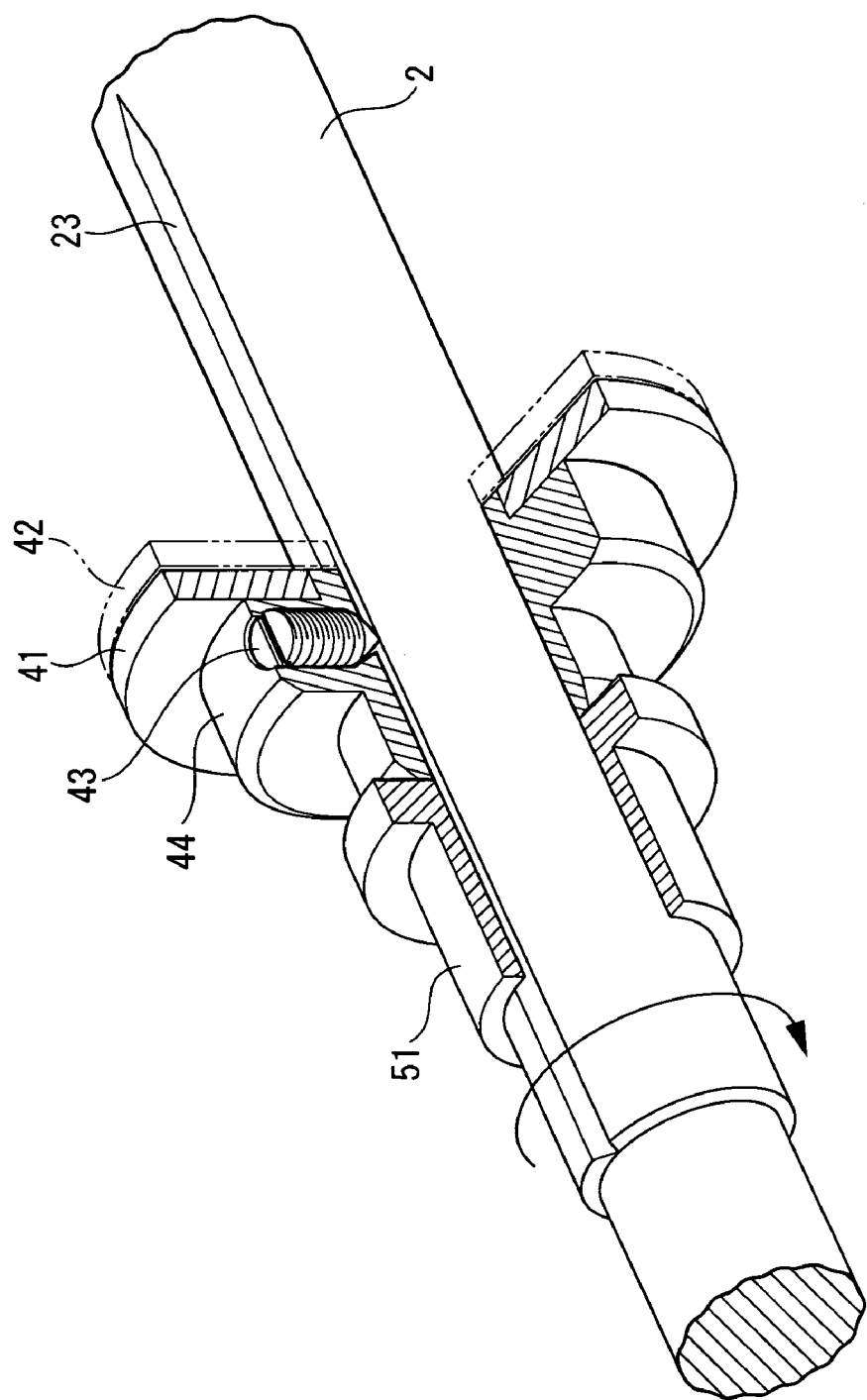
FIG. 6 is a cross-section obliquely viewing a periphery of a rotor of a traditional digital micrometer from above.
Figure 7:
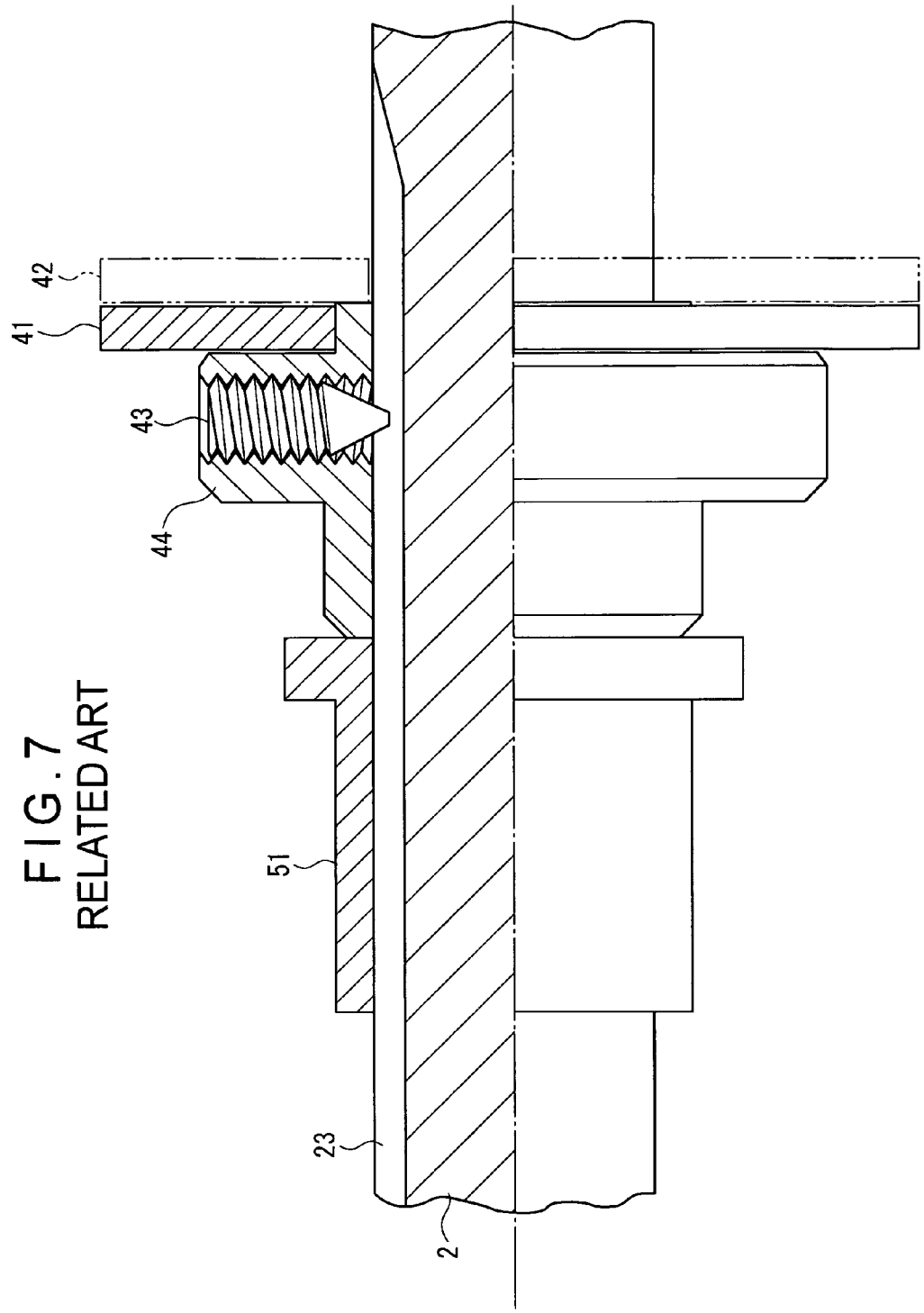
FIG. 7 is a cross-section viewing the periphery of the rotor of the traditional digital micrometer from the side.
Figure 8:
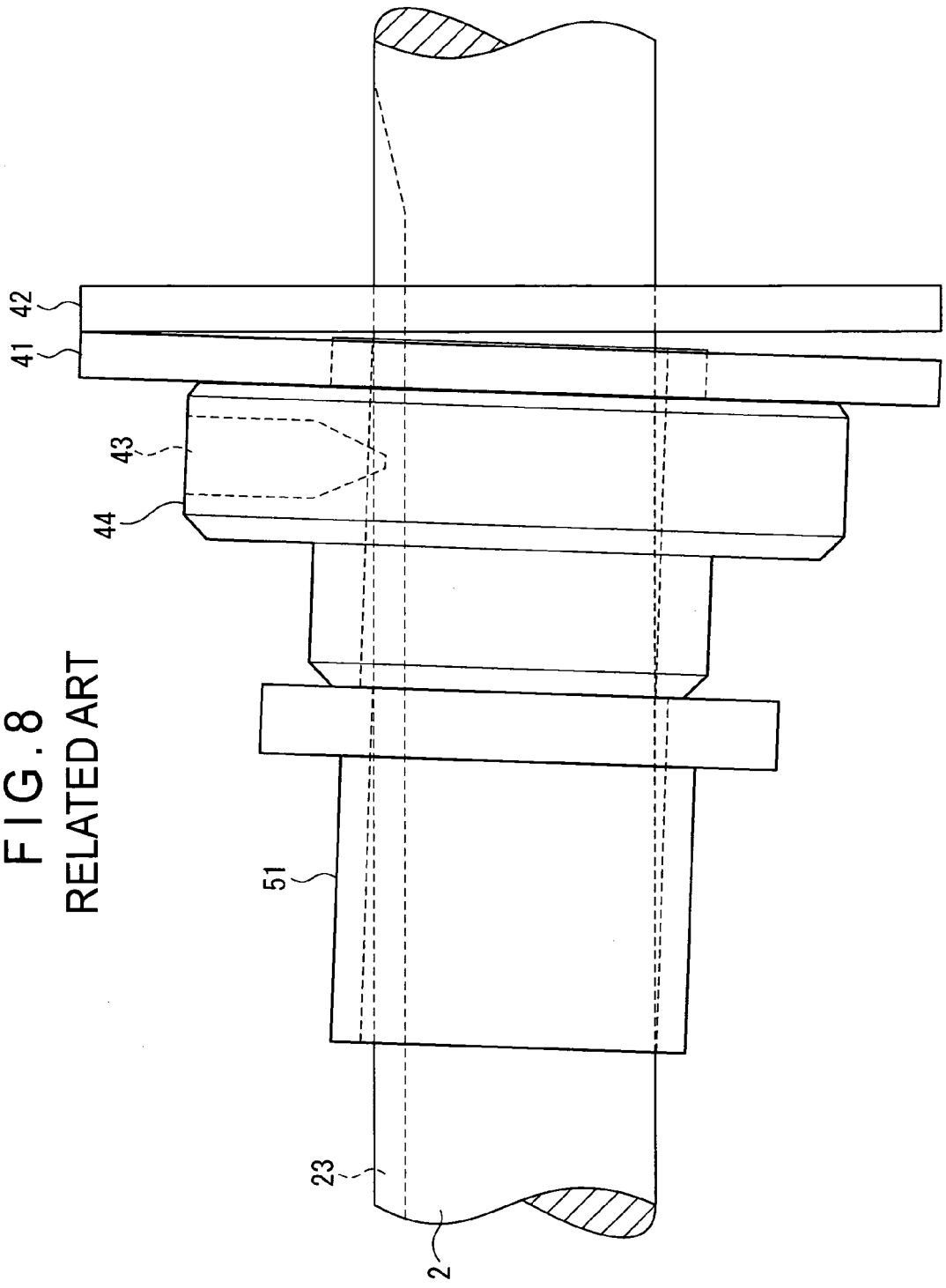
FIG. 8 is a view showing an arrangement around the rotor of the traditional digital micrometer.
Figure 9A:
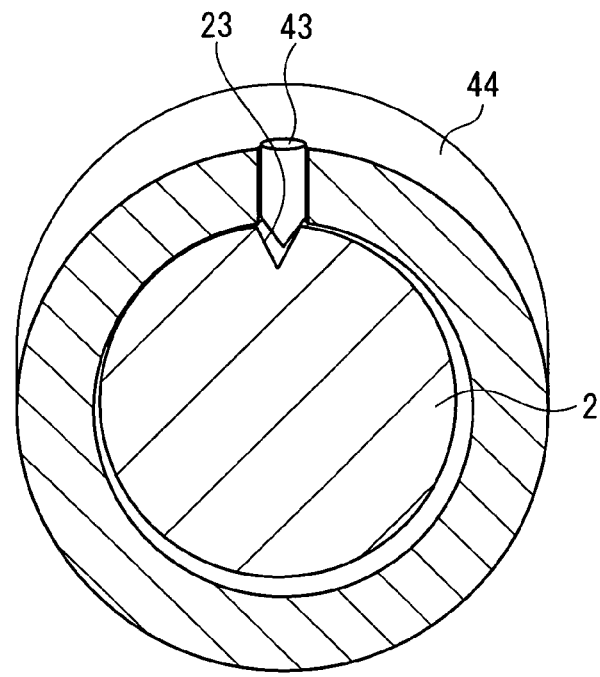
FIG. 9A is a view showing an engagement condition of an engaging key and a key groove of the traditional digital micrometer.
Figure 9B:
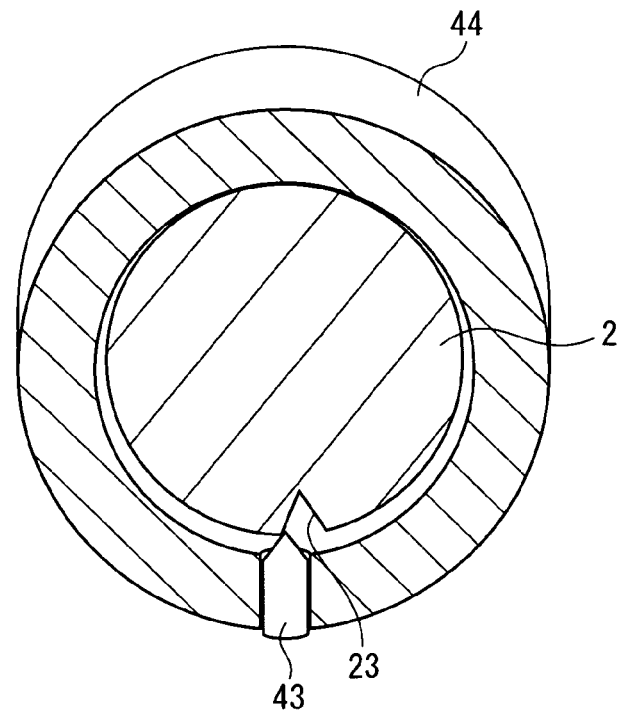
FIG. 9B is a view showing another engagement condition of the engaging key and the key groove of the traditional digital micrometer.

FIG. 5 shows the periphery of the rotor bushing when the fixing portion is hooked inclining against the spindle.

As shown in FIG. 5, since the digital micrometer 100 of the present embodiment includes the rotor bushing attitude retainer 52, even if the fixing member 51 is hooked inclining against the spindle 2, upper ends of the two second abutment portions 523 contact with the fixing member 51 to eliminate influence caused by the inclination of the fixing member 51 thereby keeping the rotor bushing 44 at a proper position.

In addition, although FIG. 5 shows the fixing member 51 hooked vertically inclining against the spindle 2, ends of the two second abutment portions 522 contact with the fixing member 51 to eliminate influence caused by the inclination of the fixing member 44, so that the rotor bushing 44 can be kept at a proper position even when the fixing member 51 is hooked horizontally inclining against the spindle 2.

[Usage of Digital Micrometer]

The thimble 3 is rotated to advance and retract the spindle 2 relative to the anvil 10A to bring an end of the spindle 2 and the anvil 10A into contact with target portions of an object to be measured. At this time, the rotation of the spindle 2 is transmitted to the rotor 41 through the key groove 23, the engaging key 43 and the rotor bushing 44. The rotation angle of the rotor 41 detected by the encoder 40 is converted into the axial displacement of the spindle 2 to be displayed on the display 61.

[Advantage of Embodiment]

Since the digital micrometer 100 is provided with the rotor bushing restrictor 50 having a fixing member 51 fixed on the body 10 and a rotor bushing attitude retainer 52 placed between the rotor bushing 44 and the fixing member 51 to be contacted with both of the rotor bushing 44 and the fixing member 51, movements of the rotor bushing 44 along the axial direction of the spindle 2 away from the stator 42 can be restricted.

This arrangement helps the rotor 41 to stay at a predetermined position keeping a constant gap to the stator 42 regardless of axial movements of the spindle 2.

Since the rotor bushing attitude retainer 52 contacts with both of the rotor bushing 44 and the fixing member 51 such that the rotor bushing 44 and the axis of the spindle 2 are orthogonal with each other, the rotor bushing 44 can be kept at a proper position without being inclined against the spindle 2 even if the fixing member 51 of the rotor bushing attitude retainer 52 inclines against the spindle 2.

A problem that the depth position of the engaging key 43 relative to the key groove 23 changes according to the rotation of the spindle 2 becomes therefore less likely to happen and rotation transfer errors can be decreased.

The rotor bushing 44 and the axis of the spindle 2 are orthogonal with each other since the two first abutment portions 522 of the rotor bushing attitude retainer 52 are symmetrically placed to each other with respect to the axis of the spindle 2, the two second abutment portions 523 are symmetrically placed to each other with respect to the axis of the spindle 2 and the two first abutment portions 522 and two second abutment portions 523 are placed such that a straight line connecting the two first abutment portions 522 and a straight line connecting the two second abutment portions 523 are orthogonal with each other.

Since the fixing member 51 that is substantially cylindrically shaped and fixed on the body 10 so as to surround the spindle 2 is a member also provided on conventional digital micrometers, the inclination of the rotor bushing 44 against the spindle 2 can be easily prevented just by applying the rotor bushing attitude retainer 52 to the conventional digital micrometers.

In addition, since the rotor bushing attitude retainer 52 is a simply shaped member that includes the body section 521 that is substantially disc-shaped, the hole 521A provided on the body section 521 through which the spindle 2 passes, the two first abutment portions 522 that are two projections provided on the first surface of the body section 521 and the two second abutment portions 523 that are two projections provided on the second surface of the body section 521, the rotor bushing attitude retainer 52 can be inexpensively produced by processing metals, resins and the like, which can suppress the cost for providing the rotor bushing attitude retainer 52 to the conventional digital micrometers.

Since the rotor bushing attitude retainer restricting section 512 provided on the fixing member 51 restricts vertical movement of the rotor bushing attitude retainer 52 with respect to the axis of the spindle 2, the movable scope of the rotor bushing attitude retainer 52 can be limited.

This can prevent, for example, an occurrence of a problem such that a smooth rotation of the spindle 2 is interrupted by the spindle 2 contacting with the rotor bushing attitude retainer 52.

Since the fixing member 51 is a member also provided on conventional digital micrometers, the rotor bushing attitude retainer 52 can easily be prevented from perpendicularly moving relative to the axis of the spindle 2 just by adding the recess 511A that can house the rotor bushing attitude retainer 52 on an end surface, which is on the side of the rotor bushing 44, of the fixing member 51 provided on the conventional digital micrometers.

[Modification of Embodiment]

The scope of the present invention is not limited to the above embodiment but includes following modifications as long as an object of the present invention can be achieved.

The shape and the like of the rotor bushing attitude retainer 52 are not limited to those described in the present embodiment.

The shape of the two first abutment portions 522 and the two second abutment portions 523 is not limited to a substantially rectangular parallelepiped as mentioned in the present embodiment, but may be other shapes such as a sphere, a column, a cone and the like.

The body section 521 of the rotor bushing attitude retainer 52 is not limited to be substantially disc-shaped as long as the body section 521 has the hole 521A through which the spindle 2 is passed. For example, the body section 521 may have other shapes such as a polygonal plate and the like. The body section 521 may also have a certain depth in the axial direction of the spindle 2.

Similarly, the body section 521A is not limited to be substantially circle-shaped as described in the present embodiment as long as the spindle 2 can be passed through. For example, the hole 521A may have other shapes such as a polygon and the like.

Even if the above-mentioned arrangements are applied, the same excellent advantages as the present embodiment can be enjoyed.

The rotor bushing attitude retainer restricting section 512 is not limited to the arrangement, the shape and the like described in the present embodiment.

An arrangement where the rotor bushing attitude retainer restricting section 512 is provided on the flange 511 of the fixing member 51 is shown in the exemplary embodiment, however the arrangement is not limited. For example, the rotor bushing attitude retainer restricting section 512 may be provided on the rotor bushing 44. This arrangement can also bring the same excellent advantages as the present embodiment.

The number of the engaging key 43 provided on the rotor bushing 44 and the key groove 23 provided on the spindle 2 is, however not limited to, one for each in the present embodiment. For example, a plurality of engaging keys 43 may be provided on the rotor bushing 44 and a plurality of key grooves 23 may be axially provided on the external surface of the spindle 2 correspondingly. In this case, since a plurality of the engaging keys 43 are slidably engaged with the spindle 2, positioning of the rotor 41 with respect to the spindle 2 becomes more secure to prevent shaky movements of the rotor 41 relative to the spindle 2.

Although a digital micrometer 100 was mentioned as an example of a digital displacement measuring instrument in the present embodiment, the present invention may be embodied in a different device. For example, the present invention may be embodied in a digital micrometer head and the like as long as the spindle 2 slidably provided on the body 10 and the encoder 40 that detects displacement of the spindle 2 are provided.

In addition, the encoder 40 is not limited to the electrostatic encoder described in the embodiment. An optical encoder, an electromagnetic encoder and the like may be used as the encoder 40 as long as the encoder 40 is a digital encoder that detects relative rotation of the stator 42 and the rotor 41.

The priority application Number JP 2007-014630 upon which this patent application is based is hereby incorporated by reference.

What is claimed is:

1. A digital displacement measuring instrument, comprising:
    a body;
    a spindle slidably provided on the body; and
    an encoder that detects displacement of the spindle,
    wherein the encoder comprises a rotor that rotates in a circumferential direction of the spindle and a stator that is fixed on the body being spaced apart from the rotor by a predetermined gap,
    wherein the rotor is supported by a rotor bushing comprising an engaging key engageable with a key groove axially provided on an external circumference of the spindle in a manner that the gap between the rotor and the stator is kept constant,
    wherein the rotor bushing comprises a rotor bushing restrictor that prevents the rotor bushing from moving in a direction away from the stator along the axial direction of the spindle, and
    wherein the rotor bushing restrictor comprises:
    a fixing member fixed on the body; and
    a rotor bushing attitude retainer placed between the rotor bushing and the fixing member to be contacted with both of the rotor bushing and the fixing member to keep the rotor bushing in an attitude substantially perpendicular to the axis of the spindle.

2. The digital displacement measuring instrument according to claim 1,
    wherein the rotor bushing attitude retainer comprises:
    two first abutment portions contacted with the rotor bushing; and
    two second abutment portions contacted with the fixing member,
    wherein the two first abutment portions are symmetrically placed to each other with respect to the axis of the spindle,
    wherein the two second abutment portions are symmetrically placed to each other with respect to the axis of the spindle, and
    wherein the two first abutment portions and the two second abutment portions are placed such that a straight line connecting the two first abutment portions and a straight line connecting the two second abutment portions are substantially orthogonal with each other.

3. The digital displacement measuring instrument according to claim 2,
    wherein the fixing member is formed in a substantially cylindrical shape and is fixed on the body so as to surround the spindle,
    wherein the rotor bushing attitude retainer comprises a body section that is substantially plate-shaped and a hole provided on the body section through which the spindle passes, and
    wherein the two first abutment portions are two projections provided on a first side of the body section and the two second abutment portions are two projections provided on a second side of the body section.

4. The digital displacement measuring instrument according to claim 1,
    wherein at least one of the rotor bushing and the fixing member comprises a rotor bushing attitude retainer restricting section that restricts vertical movement of the rotor bushing attitude retainer with respect to the axis of the spindle.

5. The digital displacement measuring instrument according to claim 3,
    wherein the fixing member comprises a rotor bushing attitude retainer restricting section that restricts vertical movement of the rotor bushing attitude retainer with respect to the axis of the spindle, and
    wherein the rotor bushing attitude retainer restricting section comprises a recess provided on an end surface of the fixing member on a side of the rotor bushing to house the rotor bushing attitude retainer.

* * * * *